Aug. 21, 1962 D. P. DOLBY 3,050,105

SPLICING APPARATUS WITH INDEXING MEANS

Filed Dec. 3, 1958 4 Sheets-Sheet 1

DALE P. DOLBY

*INVENTOR*

*BY* Flehr and Swain

ATTORNEYS

DALE P. DOLBY
INVENTOR
BY
Flehr and Swain
ATTORNEYS

DALE P. DOLBY

*INVENTOR*

BY

Fehr and Swain

ATTORNEYS

SPLICING APPARATUS WITH INDEXING MEANS

Filed Dec. 3, 1958

DALE P. DOLBY

INVENTOR

BY

ATTORNEYS

United States Patent Office 3,050,105

Patented Aug. 21, 1962

3,050,105

SPLICING APPARATUS WITH INDEXING MEANS

Dale P. Dolby, Cupertino, Calif., assignor to Ampex Corporation, Redwood City, Calif., a corporation of California Filed Dec. 3, 1958, Ser. No. 777,867
10 Claims. (Cl. 156—379)

This invention relates generally to a splicing apparatus and more particularly to a splicing apparatus suitable for splicing a tape-like medium, for example, magnetic tape.

In copending applications Serial No. 524,004, filed July 25, 1955, now Patent No. 2,956,114, and Serial No. 427, 138, filed May 3, 1954, now Patent No. 2,916,546, there is disclosed a system and apparatus making use of a rotary head assembly for recording and/or reproducing signal intelligence. The head assembly employs one or more transducer units or heads which are mounted to rotate and sweep across a pliable tape-like medium, such as that which is commonly known as magnetic tape. A concave guide holds the tape in cupped condition to conform to the sweep path of the transducer unit and to guide the same past the units. Means are employed for driving the head assembly and magnetic tape to insure proper speed of rotation of the head assembly and movement of the tape past the head, and to insure proper tracking of the head with the recorded track portions during playback.

Systems of the above character necessarily involve separate track portions extending across the tape, each track portion being formed by the sweep of a transducer unit across the tape. During playback, current variations provided by each transducing unit as it sweeps across the track portions are combined to form a composite signal corresponding to the original recorded signal.

Video signals contain picture information and synchronizing information (timing waveform). Generally, there are two types of synchronizing information: that which occurs during each horizontal scanning line, at a frequency of 15,750 c.p.s. for U.S. standard signals, and that which occurs during each frame, at a frequency of 60 c.p.s. for U.S. standard signals. In color video signals, the synchronizing signal frequencies are modified slightly giving a horizontal scanning frequency of 15,734 c.p.s., and a frame frequency of 59.94 c.p.s.

As is well known, the timing waveforms serve to synchronize a receiver whereby the signal is detected and suitably displayed. When a magnetic recording of the above character is spliced, the timing information may be disturbed, and the reproduced signal will cause the receiver to lose synchronism. The picture on the receiver is disturbed for several frames until the receiver regains synchronism.

In copending application Serial No. 722,558, filed March 19, 1958, there is described a tape recording and reproducing system of the above character in which the recorded tape may be spliced, edited, etc., and in which the synchronizing (timing) information is not appreciably disturbed. The splice occurs at the end of one field and at the beginning of the next field whereby complete fields before and after the splice are reproduced and transmitted.

In said copending application, the recording is carried out in such a manner that the vertical synchronizing pulses occur at substantially the same transverse position on the tape in their respective track and in which editing pulses are recorded on the margin of the tape at predetermined fixed positions with respect to the vertical synchronizing pulses. Subsequently, the tape is developed and the fields are then identified by the editing pulses which occur on the margin of the tape.

It is a general object of the present invention to provide a splicing apparatus suitable for rapidly and accurately splicing a magnetic tape recording of the above character.

It is another object of the present invention to provide a splicing apparatus which is relatively simple in construction and easy to operate.

It is another object of the present invention to provide an apparatus of the above character which includes means for moving the tape into a cutting area where a guide serves to guide a cutting tool to accurately cut the tape, and means for forming a competent splice between the ends of the tape.

These and other objects of the invention will become more clearly apparent from the following description when taken in conjunction with the accompanying drawing.

Referring to the drawing.

Briefly, the magnetic tape ends to be spliced are placed on spaced aligned tape guides which include means for advancing the magnetic tape longitudinally. A tape support is disposed between the aligned guides to receive the ends of the tape. A cutting guides provides means for cutting the ends of the tape at an appropriate angle and for accurately positioning the tape. After the tape is cut, the ends are raised and a splicing tape is drawn over the support surfaces. The ends of the magnetic tape are lowered and pressed against the splicing tape to form a splice.

Figure 1:
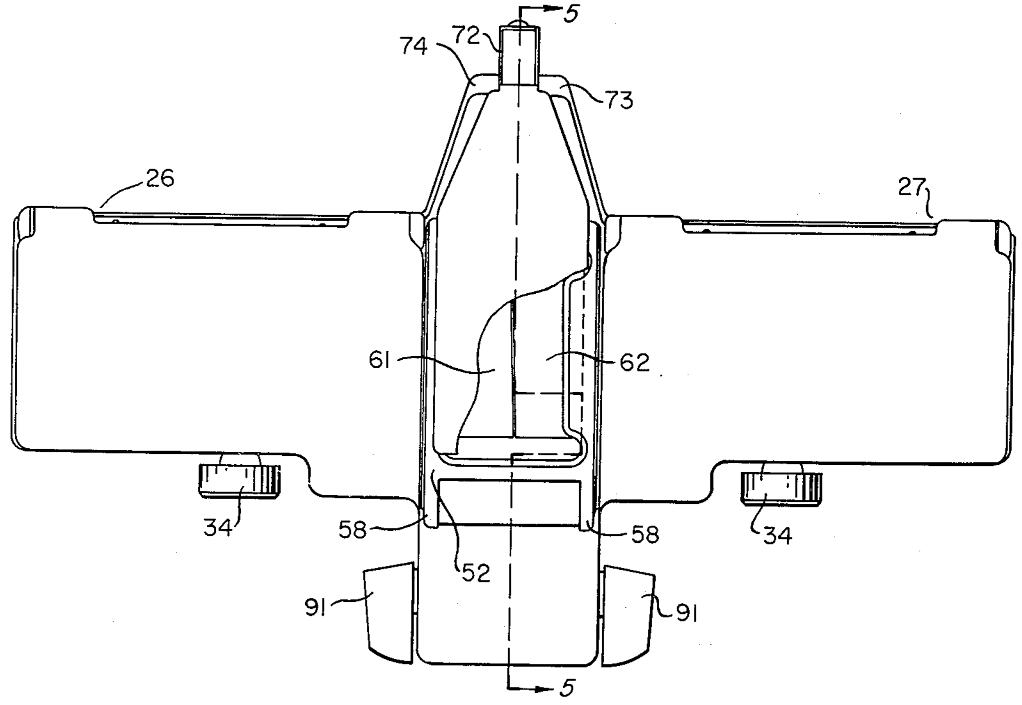
FIGURE 1 is a plan view, partly sectioned, of splicing apparatus in accordance with the invention.
Figure 2:
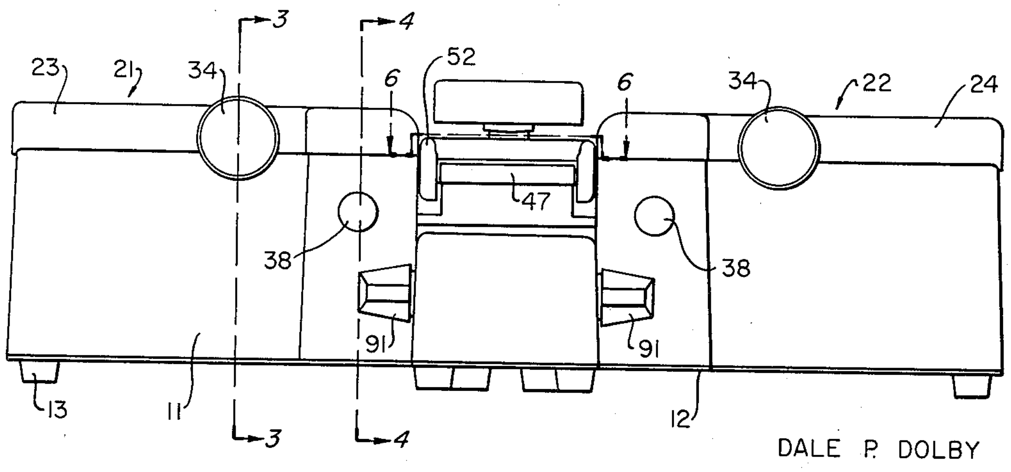
FIGURE 2 is an end elevational view of the splicing apparatus.
Figure 3:
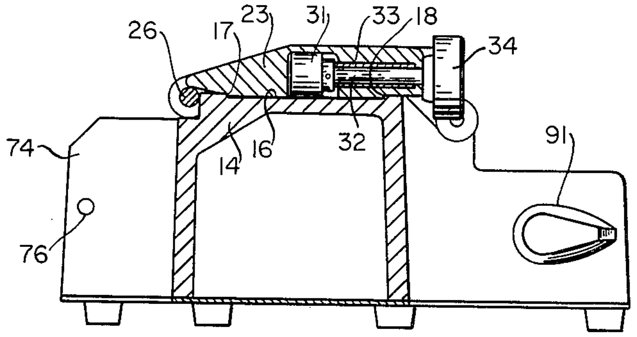
FIGURE 3 is a sectional view taken along the line 3—3 of FIGURE 2.
Figure 4:
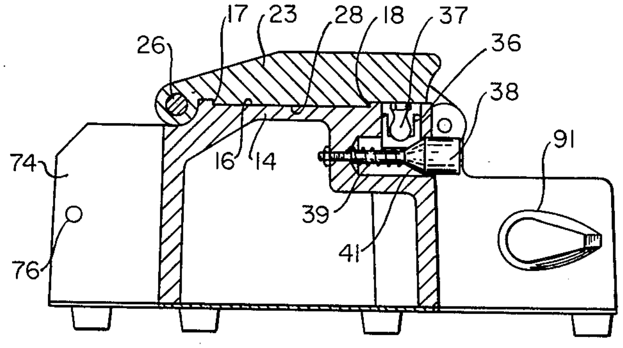
FIGURE 4 is a sectional view taken along the line 4—4 of FIGURE 2.

Referring to FIGURES 1 and 2, the apparatus includes a housing 11 having a bottom 12 to which suitable rubber feet 13 are secured. As seen in FIGURES 3 and 4, the sides of the housing include an upper surface 14 having a tape guide 16 which is a shallow channel formed by machining the surface 14. The channel is defined by shoulders 17 and 18 which serve to guide the side edges of the tape so that it moves longitudinally in the channel. Identical channels are formed on the ends 21 and 22 of the apparatus and are aligned with one another. A tape support to be presently described is disposed between the adjacent ends of the channel.

Identical covers 23 and 24 are hinged to the back of the housing as illustrated at 26 and 27, respectively, and are adapted to hold the tape in the respective guide channel. Referring to FIGURES 3 and 4, the lower surface of the cover includes a rib 28 which is adapted to fit within the channel 16. The rib is of such depth that a clearance space exists between the bottom surface of the channel 16 and the rib 28 so that the tape may move freely within the guide channels.

Means are included in each cover for moving the tape longitudinally within the channel. Referring to FIGURE 3, the means illustrated comprises a rubber roller 31 secured to the shaft 32 which is carried within a bushing 33. A knob 34 is provided whereby the roller 31 may be rotated from the front of the apparatus to move the magnetic tape in either direction as desired.

Means are provided for holding the cover in closed position. For example, the means may comprise a catch 36 which is adapted to receive the rounded stud 37 and to hold the same. A spring loaded release button 38 is provided for releasing the cover. By pressing the button 38 inwardly against the urging of the spring 39, the cam surface 41 engages the rounded end of the stud 37 and urges the same upwardly to release the cover.

The housing includes a surface 46 which receives a tape support 47, FIGURES 2, 5, 6, 7 and 9. The tape support 47 may be secured to the surface by means of screws 48, FIGURE 7. The tape support is disposed between the spaced ends 49 and 50 of the guide surfaces and coplanar with the surface. As will be presently described, the tape support provides a surface for cutting and splicing the tape.

Figure 6:
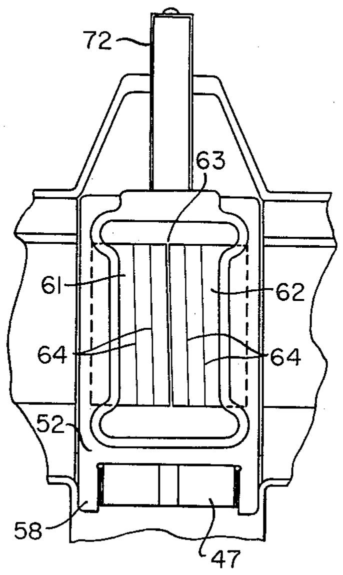
FIGURE 6 is a sectional view taken along the line 6—6 of FIGURE 2.

A cutter guide frame 52 is hingably secured to the front edge of the support plate. For example, the hinge may include a pair of cooperating grooves 53 and 54 formed on the support receiving surface 46 and on the bottom surface of the support 47. The grooves receive a pin 56 which extends into the ears 58 formed on the guide frame. Referring to FIGURE 6, the frame has mounted therein a pair of lenses 61 and 62 which are spaced to form a cutting slot 63 which is inclined at the same angle as the transverse tracks formed on the magnetic tape. The glass lenses may carry hairlines 64 which are spaced to correspond to the spacing between a predetermined number of transverse recorded tracks, as will be presently described. The bottom surfaces of the lenses are adapted to ride on the tape support. When the tape ends are placed on the support, the bottom surface of the lens and the upper surface of the support serve to tightly engage the tape and prevent movement of the same.

Figure 5:
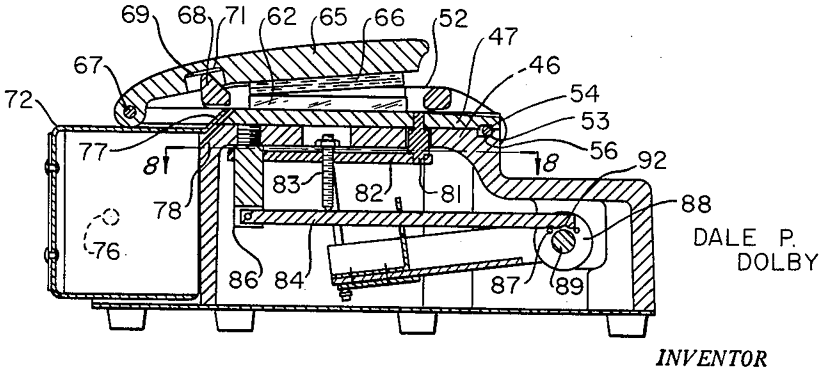
FIGURE 5 is a sectional view taken along the line 5—5 of FIGURE 1.

Means are provided for applying pressure to the tape ends for securing the ends to the splicing tape. Such means may comprise a pressure arm 65 which carries a pressure pad 66. The arm 65 is suitably hinged by means of a pin 67 to the back end of the support plate 47 (FIGURE 5). When not in use or when the apparatus is being shipped or transported, it is desirable to be able to close the lens support and then close the arm 65 over the lens support. For this purpose, the rear end of the cutter guide frame 52 is provided with an upwardly extending abutment 68 which engages a pad 69 carried in the slot 71 formed in the arm 65.

As described, the splices are generally formed by employing a splicing tape. Preferably, the splicing tape is carried in a tape magazine 72, FIGURES 1, 5, 6 and 7, which is releasably mounted between the rearwardly extending portions 73 and 74 of the housing which cooperate to form a magazine accommodating slot. The sides of the magazine include dimples which engage the spaced holes 76 formed in the members 73 and 74. The tape extends upwardly through the opening formed between the upper surface of the magazine 77 and the adjacent portion of the housing 78 and is available at the support plate. The tape may than be drawn forward across the support plate with its adhesive surface up whereby the ends of the magnetic tape may be laid upon the same. The pressure pad 66 serves to urge the tape against the adhesive to form a competent connection between the ends of the magnetic tape and the splicing tape.

Figure 7:
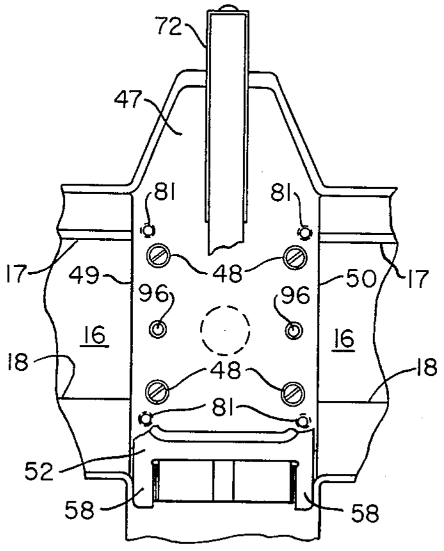
FIGURE 7 is a plan view, partly in section, of the tape support region.
Figure 9:
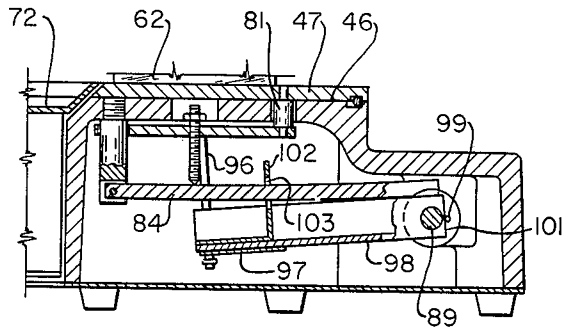
FIGURE 9 is a sectional view similar to FIGURE 5 but showing the operating parts in another position.
Figure 8:
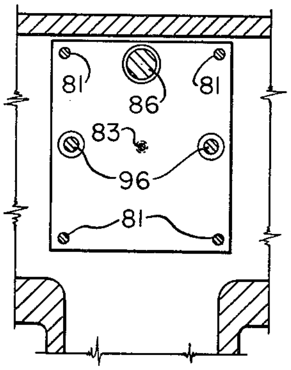
FIGURE 8 is a sectional view taken along the line 8—8 of FIGURE 5.

As previously described, the bottom edge of the lenses and the top edge of the support serve to engage and securely hold the tape. However, it is desirable to provide means for releasing the tape for longitudinal movement and yet leave the cover closed so that the magnetic tracks may be lined up with the indexing lines 64. Referring to FIGURES 5, 7 and 9, clearance plungers 81 are provided for this purpose. The plungers 81 extend upwardly through openings formed in the support 47. The lower ends of the plungers are supported by a lifting plate 82. The lifting plate 82 threadably receives an adjustable screw 83 whose lower end rides upon the cam arm 84. A pivot 86 is secured to the housing and pivotally receives one end of the cam arm 84. The other end of the cam arm is supported on a lift pin 87 carried on the lifting cam 88. The lifting cam 88 is secured to a cam shaft 89 which extends through the housing and is provided with knobs 91 at its two ends, FIGURES 1, 2, 3 and 4. By rotating the shaft 89, the pin 87 will ride into the groove 92 and lift the end of the cam arm. Lifting the end of the cam arm will pivot the same and lift the abutting screw 83. As a result, the plate 82 will be lifted, lifting the spaced clearance plungers. The upper ends of the plungers lift the cutter guide frame to provide clearance for movement of the tape between the bottom surface of the lenses and the upper surface of the support. The apparatus will remain locked in this position due to the engagement of the pin 87 in the notch 92.

Figure 10:
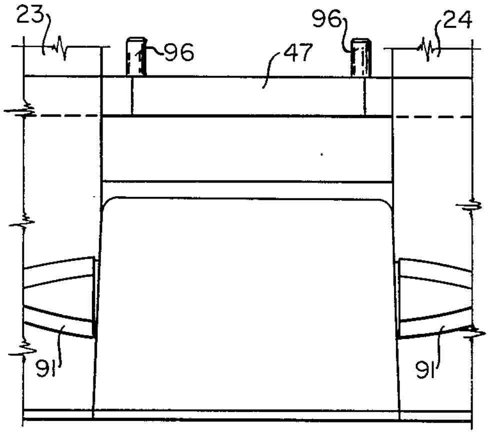
FIGURE 10 is an enlarged partial elevational view showing the tape support surface.
Figure 11:
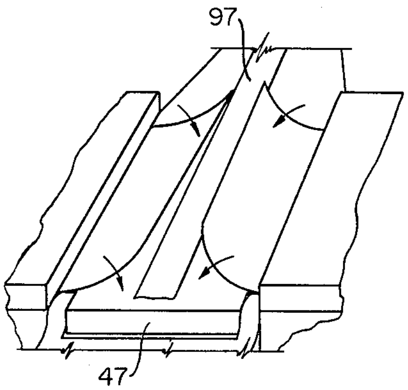
FIGURE 11 is an enlarged view of the tape support surface with the tape ends extending over the same.

After the ends of the tape are cut, it is desirable to be able to lift the ends so that the splicing tape may be drawn across the support with the adhesive side up to receive the end portions. Means are provided in the instant apparatus for lifting the ends of the tape by further rotative movement of the knobs 91. For this purpose, spreader pins 96, FIGURES 5, 7, 9 and 10 are provided. The spreader pins are adapted to extend upwardly through the support plate a considerable distance as shown in FIGURE 10. The pins engage the tape and lift the same as illustrated in FIGURE 11. With the tape lifted, the splicing tape 97 may be drawn across the support plate in position to receive the end portions of the magnetic tape. The lower ends of the pins 96 are suitably attached to a pin support plate 97 which is carried by the pin lift arm 98. The arm 98 is in the form of a channel which has extending ear portions which ride on the shaft 89. A pin 99 is carried on the cam 88 and further rotative movement of the knobs 91 past the frame lifting position will cause the pin 99 to abut the end 101 of the channel 98 and to cause the channel to rotate upwardly lifting the pins. A stop 102 which includes an opening 103 through which the cam arm 84 passes serves to prevent the arm 98 from rotating downwardly and the pins to be completely retracted from their openings.

Figure 13:
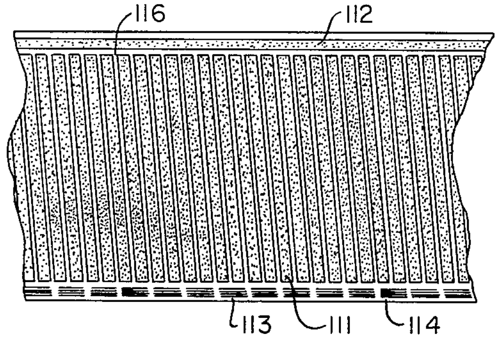
FIGURE 13 shows a portion of magnetic tapes with the recordings "developed," said tape being enlarged in the longitudinal direction to more clearly illustrate the recorded track portions.
Figure 12:
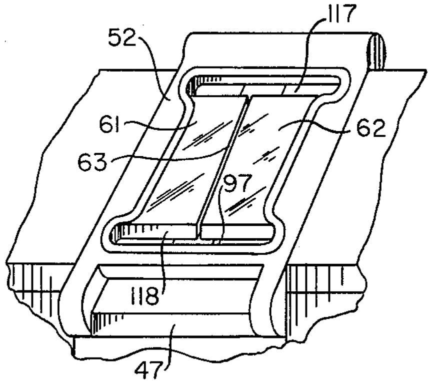
FIGURE 12 is a view showing the cutter guide in position.

As previously described, the magnetic tape includes transverse record tracks 111 which are spaced longitudinally a slight distance from one another and which include the video intelligence. In accordance with the apparatus described in said copending applications, the upper margin of the tape is erased and a longitudinal sound track 112 is formed thereon. A longitudinal control track 113 is formed along the other margin. The control track 113 includes editing pulses 114, in accordance with said copending application. As described in said copending application, the editing pulses 114 define fields. For example, in the illustration of FIGURE 13, each field includes 16 transverse tracks.

To edit or splice the tape, it is desirable to "develop" the tape. Preferably, it is desirable to make the recorded information visible. A magnetic tape recording may be "developed" whereby the magnetic pattern may be visually observed by dispersing magnetic powder on the tape. For example, the tape may be sprayed with a volatile carrier which suspends carbonyl iron. When the coating is applied, the vehicle or carrier evaporates and leaves the magnetic powder, for example, carbonyl iron, on the surface of the tape. The density of the particles will be directly dependent upon the intensity of the underlying recording. Thus, the transverse tracks 111 become visible, the control and sound tracks 113 and 112 become visible, and the editing pulses 114, which are points of saturation on the magnetic tape, become visible.

The tape to be spliced is entered from both sides of the splicing apparatus in the channels 16. The covers 23 and 24 are closed and the frame and lenses are lowered on the support. The knobs 91 are moved to lift the clearance plungers and the knobs 34 are rotated to move the tape longitudinally. While the tape is being moved, the operator views through the lenses and lines up the inclined hairlines 64 with the spaces 116 which appear between the transverse track portions. The operator lines up the editing pulses 114 for the two end portions so that they overlap. Thus, when a cut is made, the editing pulses will occur at the same interval of time across the splice. By cutting just on the editing pulse which occurs at the beginning of each frame, a complete field may be removed. When the tape is properly aligned, a cutting tool, for example, a cutting knife or razor blade is inserted in the inclined slot 63 and moved across to cut the tape. The frame is then lifted and the knobs 91 further rotated to lift the spreader pins 96 which then lift the tape as illustrated in FIGURE 11. The cut off portions of the tape are removed. The splicing tape is positioned on the support surface by drawing the same across the support surface. The knobs 91 are then released. The pressure arm is then brought forward with the pressure pad in contact with the ends of the tape and pressure is applied to secure the ends of the magnetic tape to the adhesive side of the splicing tape. The pressure arm is then lifted and the frame with lenses is lowered and secured over the tape. The cutter is then run across the ends 117 and 118 of the lenses to cut off the splicing tape 97 to give a competent splice.

Thus, it is seen that there is provided a splicing apparatus which is easy to operate and which will give rapid and accurate splices.

I claim:

1. Apparatus for use in splicing tape comprising first and second guide means each adapted to receive and guide a tape end, means associated with each guide for moving the tape longitudinally in said guide to accurately position the ends of the tape, support means disposed to receive the ends of the tape, and means for releasably holding the tape on said supporting means, said last named means including a transparent plate whereby said tape is visible for indexing, said plate also serving as a guide for cutting the tape.

2. Apparatus for use in splicing tape comprising first and second guide means each adapted to receive and guide a tape end, a cover associated with each of said guide means, means carried by said cover for advancing the tape in said guide means for longitudinally positioning the tape, support means disposed to receive the ends of said tape, means for releasably holding the tape on said supporting means, said last named means including a transparent plate whereby said tape is visible for indexing, said plate also serving as a guide for cutting the tape.

3. Apparatus for use in splicing tape comprising first and second guide means each adapted to receive and guide a tape end, means for movng the tape on said guide means for longitudinally positioning the tape, support means disposed to receive the ends of said tape, means for releasably holding the tape on said supporting means, said last named means including a transparent plate whereby said tape is visible for indexing, said plate also serving as a guide for cutting the tape, means for lifting said holding means to release the tape, and an indexing means for positioning the tape.

4. Apparatus for use in splicing tape having transverse tracks magnetically recorded thereon, comprising first and second guide means each adapted to receive and guide a tape end, means for accurately positioning the ends of the tape with respect to one another, support means disposed to receive the ends of said tape, means for releasably holding the tape on said supporting means, said last named means including an indexing means and a guide means for guiding a tape cutter, said indexing means including at least one index mark permanently spaced from said cutter guide means for a distance corresponding to the width of at least one of said tracks of said tape, and means for lifting the ends of said cut tape.

5. Apparatus for use in splicing tape comprising a housing, first and second aligned spaced guide means on the upper surface of said housing, first and second covers hinged to said housing and adapted to hold a pair of tape ends in said guide means, means carried by each of said covers for moving the tape longitudinally within said guide means, support means disposed to receive the ends of said tape, means hinged to said housing adapted to releasably hold the tape on said supporting means, said last named means including a guide for cutting the tape and indexing means for positioning the tape, said indexing and cutter guiding means being substantially coincident for the reduction of error in cutting, means for lifting said holding means whereby the tape is free to move longitudinally, and means extending through said supporting means for lifting the ends of the tape when the holding means is swung away from the support.

6. Apparatus for use in splicing tape comprising a housing, first and second aligned spaced guide means on the upper surface of said housing, first and second covers hinged to said housing and adapted to hold a pair of tape ends in said guide means, means carried by each of said covers for moving the tape longitudinally within the guide means, support means disposed to receive the ends of the tape, means hinged to said housing adapted to releasably hold the tape ends on said supporting means, said last named means including a guide for cutting the tape and indexing means for positioning the tape, said indexing and cutter guiding means being substantially coincident for the reduction of error in cutting, means for lifting said holding means whereby the tape is free to move longitudinally, means extending through said supporting means for lifting the ends of the tape when the holding means is swung away from the support, a pressure plate hingably secured to said support means and adapted to press the ends of the tape against a splicing tape.

7. Apparatus for use in splicing tape comprising a housing, first and second aligned spaced guide means on the upper surface of said housing, first and second covers hinged to said housing and adapted to hold a pair of tape ends in the guide means, means carried by each of said covers for moving the tape longitudinally in the guide means, support means disposed to receive the ends of the tape, means hinged to said housing adapted to releasably hold the tape on the supporting means, said last named means including a guide for cutting the tape and indexing means for positioning the tape, spaced pins extending through said supporting means and adapted to lift the holding means whereby the tape is free to move longitudinally on said support means, means carried within said housing and adapted to lift said pins, and means extending through said support means for lifting the ends of the tape when the holding means is swung away from the support.

8. Apparatus as in claim 7 in which said last named means comprises a pair of spaced pins extending upwardly through the support means.

9. Apparatus for use in splicing tape comprising a housing, first and second aligned spaced guide means on the upper surface of said housing, first and second covers hinged to said housing and adapted to hold a pair of tape ends in said guide means, means carried by each of said covers for moving the tape longitudinally within said guide means, support means disposed to receive the ends of said tape, means hinged to said housing adapted to releasably hold the ends of the tape on said supporting means, said last named means including a guide for cutting the tape and indexing means for positioning the tape, spaced pins extending through said support and adapted to engage the bottom surface of said releasable holding means, control means mounted on said housing, and means disposed within said housing responsive to said control means for lifting said pins to thereby lift the holding means and free the tape for longitudinal movement, a pair of spaced pins extending upwardly through the support means and adapted to lift the ends of the tape when the holding means is swung away from the support, and means carried within said housing responsive to said control means for lifting said pins.

10. Apparatus as in claim 9 in which said housing includes splicing tape magazine receiving means.

References Cited in the file of this patent

UNITED STATES PATENTS

| | | |
|---|---|---|
| 1,331,563 | Genter | Feb. 12, 1920 |
| 2,346,874 | Russell | Apr. 18, 1944 |
| 2,527,532 | Cole | Oct. 31, 1950 |
| 2,696,867 | Wensink | Dec. 14, 1954 |
| 2,748,832 | Low | June 5, 1956 |